United States Patent [19]

Adams, Jr. et al.

[11] Patent Number: 4,605,539

[45] Date of Patent: Aug. 12, 1986

[54] PHOSPHONITRILIC CHLORIDE TRIMER PURIFICATION

[75] Inventors: J. Robert Adams, Jr.; James R. Mitrano; Matthew K. Juneau, all of Baton Rouge, La.

[73] Assignee: Ethyl Corporation, Richmond, Va.

[21] Appl. No.: 671,942

[22] Filed: Nov. 16, 1984

[51] Int. Cl.$^4$ .................................... C01B 25/10
[52] U.S. Cl. ............................ 423/300; 23/293 R
[58] Field of Search .................. 423/300; 23/293 R

[56] References Cited

U.S. PATENT DOCUMENTS

| 4,175,113 | 11/1979 | Fieldhouse | 423/300 |
| 4,382,914 | 5/1983 | Horie et al. | 423/300 |

FOREIGN PATENT DOCUMENTS

| 3144751 | 5/1983 | Fed. Rep. of Germany. | |
| 1014865 | 12/1965 | United Kingdom | 423/300 |
| 242860 | 3/1968 | U.S.S.R. | 423/300 |

*Primary Examiner*—John Doll
*Assistant Examiner*—Wayne A. Langel
*Attorney, Agent, or Firm*—Donald L. Johnson; John F. Sieberth; Joseph D. Odenweller

[57] ABSTRACT

Polymer-grade cyclic phosphonitrilic chloride trimer can be obtained from crude cyclic polyphosphonitrilic chlorides by forming a solution of the crude cyclics, water washing the solution, distilling solvent to form a hot concentrate, cooling to form a precipitate and distilling the precipitate to form polymer-grade trimer.

20 Claims, No Drawings

PHOSPHONITRILIC CHLORIDE TRIMER PURIFICATION

BACKGROUND OF THE INVENTION

High molecular weight linear phosphonitrilic chloride polymers are used to make a broad range of useful polyphosphazenes by substitution of the chlorine atoms with various groups such as phenoxide, alkylphenoxide, fluoroalkoxide and the like. These polyphosphazenes can be used to make articles such as foam insulation, o-rings, hydraulic seals, wire and cable insulation, hose liners and the like. The high molecular weight linear phosphonitrilic chloride polymers used to make the various substituted polyphosphazenes can be made by the thermal polymerization of cyclic phosphonitrilic chloride trimer (referred to herein as "trimer"), preferably using a catalyst as described in U.S. Pat. Nos. 4,123,503 and 4,226,840. Not all trimer can be successfully polymerized to form a linear polyphosphonitrilic chloride. Early attempts at thermal polymerization of phosphonitrilic chloride trimer lead to the formation of hard, cross-linked polymers that were of little use. The secret to obtaining linear polymers rather than the hard, cross-linked polymers was found to be related to the purity of the phosphonitrilic chloride trimer. Various methods have been tried to purify trimer to obtain trimer that could be successfully polymerized to high molecular weight linear polymers. Various purification methods are described in U.S. Pat. Nos. 3,008,799; 3,378,353; 3,379,510; 3,677,720; 3,694,171; 3,952,086; 4,175,113 and GB Pat. No. 2,114,111.

SUMMARY OF THE INVENTION

It has now been discovered that polymer-grade cyclic phosphonitrilic chloride trimer can be obtained by water-washing a crude solution of cyclic trimer in an inert solvent followed by eavaporation of the solvent to obtain a concentrate and precipitation of trimer from the concentrate. The trimer precipitate is then distilled at reduced pessure to obtain polymer-grade trimer. As used herein "polymer-grade" refers to a cyclic phosphonitrilic chloride trimer that can be consistently polymerized to form a useful high molecular weight substantially linear polyphosphonitrilic chloride.

DESCRIPTION OF THE PREFERRED EMBODIMENTS

A preferred embodiment of the invention is a process for making a polymer-grade cyclic phosphonitrilic chloride trimer, said process comprising
(a) forming a solution of impure cyclic phosphonitrilic chlorides in an inert solvent,
(b) washing said solution with water,
(c) precipitating cyclic phosphonitrilic chloride trimer from the water-washed solution and,
(d) distilling the precipitated cyclic phosphonitrilic chloride trimer from said water-washed solution to obtain said polymer-grade cyclic phosphonitrilic chloride trimer.

Solvents which can be used include any inert liquid which will dissolve the crude mixture when hot (e.g. 50°–100° C.) but precipitate the trimer content when cooled (e.g. −10° to 30° C.). These include toluene, xylene, hexane, heptane, octane, carbontetrachloride, chloroform, 1,1,2-trichloroethane, 1,1,2,2-tetrachloroethane, 1,1,1-trichloroethane, perchloroethane, chlorobenzene, dichlorobenzene, bromobenzene, chlorotoluene, dichlorotoluene, chlorobromobenzene and the like including mixtures thereof. The preferred inert solvents are the halogenated hydrocarbons boiling in the range of about 50°–250° C. at atmospheric pressure. Use of solvents at temperatures above their normal boiling points will of course require a sealed reaction vessel operating under pessure. Such halogenated hydrocarbons include both aliphatic halogenated hydrocarbons and halogenated benzene compounds. Useful aliphatic halogenated hydrocarbons are chloroform, carbon tetrachloride, carbon tetrabromide, bromochloromethane, 1,1-dichloroethane, 1,2-dichloroethane, 1,1-dichlorobutane, 1,1-dichloro-1-bromoethane, 1,4-dichloropetane, 1,4-dichloro-2-methylbutane, 1,1-dichloropropane, 1,2-dichloropropane, 1,3-dichloropropane, 1,2-dibromobutane, 1,3-dibromobutane, 1,2-dibromo-2-methylpropane, 1,1-dibromoethane, 1,2-dibromoethane, 1,4-dibromopentane, 1,2,3-tribromo-2-methylpropane, 1,1,2-tribromoethane, 1,2,3-tribromopropane, 1,1,1-trichloroethane, 1,1,2-trichloroethane, 1,2,3-trichloropropane, 1,1,2-trichloropropane, 1,1,2,2,-tetrabromoethane, 1,1,2,2-tetrachloroethane, 1,1,1,2-tetrachloroethane and the like. Of the aliphatic halogenated hydrocarbons, the more preferred are the dihalo, trihalo, tetrahalo and perhalo $C_{2-4}$ alkanes wherein the halogens are chlorine, bromine or both chlorine and bromine.

The more preferred solvents are the halogenated benzenes such as monochlorobenzene, dichlorobenzene, trichlorobenzene, monobromobenzene, dibromobenzene, chlorobromobenzene and the like including mixtures thereof. The most preferred solvent is monochlorobenzene.

The initial trimer solution can be made by merely dissolving the impure trimer in an appropriate solvent. The initial solution should include sufficient solvent to maintain the crude trimer including impurities in solution at elevated temperatures. The crude trimer contains impurities such as higher cyclics including tetramer, pentamer and the like as well as some low molecular weight linear oligomeric phosphonitrilic chlorides. Generally, the initial solution contains in excess of 50 weight percent solvent and preferably in excess of 70 weight percent solvent, for example 70–90 weight percent solvent and about 10–30 weight percent of a crude mixture containing a substantial amount of trimer. Any solids that remain undissolved can be removed by means such as filtration or centrifugation.

Water is then added to the crude trimer solution. The amount of water can vary widely, for example from about 10 volume percent to 1000 volume percent or more of the crude trimer solution. A more useful range is about 50–100 volume percent of the trimer solution.

The wash may be conducted by merely agitating the mixture at room temperature or below. More preferably, the wash is conducted on a warm mixture, for example from 30° C. up to reflux. Good results have been obtained at about 50°–95° C., more preferably about 70°–90° C.

Usually only one wash cycle is required. However in some cases multiple washes may give improved results. For that reason, more than 1 wash may be conducted for example 2 to 5 washes in sequence.

The washed trimer solution is then heated to evaporate or distill off a portion of the solvent to form a hot concentrate. The distillation can be conducted at atmospheric pressure or at reduced pessure. Preferably vacuum is applied to moderate the temperature in the distillation re-boiler. Frequently it is not necessary to apply vacuum at the start of the solvent distillation but towards the end of the distillation vacuum is applied to keep the temperature of the residual concentrate from exceeding about 200° C. and preferably below 175° C. and most preferably below about 150° C. The distillation is continued until the residual hot concentrate has a trimer concentration which will cause precipitation of trimer upon cooling of the concentrate to temperatures in the range of −20° C. to about 40° C. and preferably upon cooling to ambient temperature (i.e. 20°–30° C.). Preferably the hot concentrate will contain less than 50 weight percent solvent and more preferably less than about 40 weight percent solvent. Using monochlorobenzene as the solvent, good precipitation has been achieved with a concentrate containing about 25–40 weight percent monochlorobenzene and the balance crude trimer. If more solvent is removed prior to precipitation and filtration, the precipitate slurry becomes very thick and difficult to handle. This may be alleviated by adding water to form a slurry of water, inert solvent and trimer precipitate. In this embodiment the solvent content can be reduced down to about 5 weight percent. This technique is more fully described in our co-pending application Ser. No. 658,301 filed Oct. 5, 1985.

A beneficial function of the water is that it increases the volume of the liquid phase so that the trimer slurry can be stirred and transferred but does not increase the amount of trimer that remains in solution because trimer is insoluble in the water phase. It should be clear that water addition is not essential and is only recommended when the solvent level is lowered to such an extent that the precipitate is difficult to handle. This usually does not occur until the inert solvent level drops below about 25 weight percent of the concentrate. When used, the volume of water should be an amount that results in a workable trimer slurry. In general a volume of about 0.1–20 times the volume of the hot concentrate can be used. Preferably the volume of water is about 50–150% of the volume of hot concentrate.

The hot concentrate with or without added water is allowed to cool to a temperature such that a substantial portion of the dissolved trimer precipitates. Preferably at least 50 weight percent and more preferably at least 60 weight percent of the dissolved trimer is precipitated on cooling. The cooled concentrate mixture can be at temperatures ranging from just above the freezing point of the solvent phase up to about 40° C. Preferably the cooled concentrate is near ambient temperature, e.g. 20°–30° C.

The precipitated crystalline trimer is then separated from the liquid phase. This can be done by conventional means such as filtration or centrifugation. Filtration has been used in development work. It is then preferred to wash the separated precipitate with water and optionally with an aliphatic hydrocarbon that can be easily removed from the precipitate by evaporation or during the initial portion of the subsequent distillation. Aliphatic hydrocarbons having a boiling temperature of about 50°–150° C., more preferably about 60°–90° C. can be used. Some examples are hexane, heptane, octane, petroleum ethers and the like including mixtures thereof.

Although not essential, the crystalline trimer is preferably dried at this stage to remove residual inert solvent and/or water prior to distillation.

The crystalline trimer is next placed in a distillation vessel. It is preferred that the trimer be handled under an inert atmosphere such as a nitrogen atmosphere. The distillation apparatus need not be a multi-plate rectification column. A simple distillation unit is adequate although a multi-plate distillation unit can be used. The trimer is heated above its melting point (appx. 115° C.) to melt the trimer. Preferably vacuum is applied while heating to assist in removal of any residual solvents or water. The molten trimer is then heated to about 130°–250° C., more preferably about 150°–175° C. and the pressure is reduced until distillation occurs. Generally the pressure will be in the range of about 10–600 torr depending on temperature. Excellent results have been achieved at a reduced pressure of about 10–25 torr at a liquid temperature range of about 130°–220° C. from the start to the finish of the distillation.

Initially a forecut is removed which contains low boiling impurities. The amount of forecut removed should be at least 0.1 weight percent of the crystalline precipitate charged to the distillation vessel. More preferably the forecut is at least 1.0 weight percent of the distillation charge. There is no real upper limit but excessive forecut removal will lower the recovery of purified trimer and thus be uneconomical. A good range to operate in is to remove about 1–10 weight percent of the precipitated trimer charged to the distillation as a forecut.

After the forecut is removed and segregated, a middle-cut or "heart-cut" is distilled over which represents the polymer grade trimer. Distillation of the heart-cut can be continued until the re-boiler liquid temperature approaches temperatures which cause decomposition or polymerization or until no further trimer distills over at the temperature/pressure conditions at which the main portion of the trimer distilled. It is preferred that the re-boiler liquid should not exceed about 200° C.

A highly preferred way to obtain the initial crude cyclic phosphonitrilic chloride trimer solution is to make the crude trimer in the same solvent used for crystallization. Thus, a highly preferred embodiment of the invention is a process for making polymer-grade cyclic phosphonitrilic chloride trimer, said process comprising (a) reacting ammonium chloride or ammonium chloride precursors with phosphorus pentachloride or phosphorus pentachloride precursors in an inert solvent for polyphosphonitrilic chlorides at an elevated temperature and at a pressure sufficient to maintain a liquid phase to form a solution of impure cyclic phosphonitrilic chloride trimer containing at least 50 weight percent of said inert solvent, (B) water-washing said solution of impure cyclic phosphonitrilic chloride trimer, (c) distilling a portion of said inert solvent from said solution to form a hot concentrate containing less than 50 weight percent of said inert solvent, (d) cooling said hot concentrate to form a precipitate of phosphonitrilic chloride trimer, (e) separating said precipitate from the inert solvent phase and (f) distilling said precipitate to recover polymer-grade phosphonitrilic chloride trimer.

In a highly preferred embodiment step (f) is carried out by distilling said trimer precipitate to first remove a forecut of at least 0.1 weight percent of said trimer precipitate to form a topped trimer and (g) continuing the distillation to recover a heart-cut of polymer-grade cyclic phosphonitrilic chloride trimer.

Examples of solvents in which the trimer can be made include those that have been listed previously as inert solvents. The preferred solvents are the halogenated benzenes such as monochlorobenzene, monobromobenzene, dichlorobenzene, chlorobromobenzene and the like including mixtures thereof. The most preferred solvent is monochlorobenzene.

The crude trimer is made by the known procedure of reacting ammonium chloride and phosphorus pentachloride in a solvent. Instead of ammonium chloride it is possible to use the precursor combination of $NH_3$ and $HCl$ which is equivalent to $NH_4Cl$. Likewise, the precursor combination of $PCl_3$ and $Cl_2$ can be used as the equivalent of $PCl_5$. In making the crude cyclic phosphonitrilic chloride trimer, the stoichiometric mole ratio is 1:1. However, in order to maximize formation of cyclics it is preferred to use a slight excess of $NH_4Cl$. A useful reactant ratio is about 1–1.5 moles of $NH_4Cl$ per mole of $PCl_5$. A more preferred ratio is about 1.05–1.25:1.0.

Preferably the reaction is conducted by slowly adding the $PCl_5$ to the $NH_4CL$ slurried in the reaction solvent over a 2–4 hour period at reaction temperature of about 100°–160° C.

The amount of solvent should be such that the resultant reaction mixture contains more than 50 percent solvent, more preferably in excess of 60 weight percent solvent and most preferably about 70–90 weight percent solvent.

Following the addition of the $PCl_5$, the mixture of $NH_4Cl$ and $PCl_5$ in the solvent (e.g. monochlorobenzene) is stirred at reaction temperature for a period sufficient to form a substantial amount of cyclic polyphosphonitrilic chloride.

A useful reaction temperature is about 100°–160° C., more preferably about 110°–150° C. and most preferably about 120°–140° C. In some cases a pressure system will be required to achieve the higher temperature because of the solvent boiling point. For example, monochlorobenzene boils at about 132° C. at atmospheric pressure so above atmospheric pressure would be required to exceed this temperature. However, good yields of cyclic phosphonitrilic chlorides high in trimer can be achieved in mono-chlorobenzene at temperatures of about 120°–130° C. so use of a pressure reactor is not required. Also conducting the reaction in a refluxing solvent makes temperature control much easier.

The reaction to form the crude trimer solution from $NH_4Cl$ and $PCl_5$ is usually complete in about 3–5 hours including $PCl_5$ addition time and post-addition cook depending upon reaction temperature. At a reaction temperature of 125° C. the reaction is complete in about 5 hours.

Following the formation of the initial solution of crude trimer there is generally some unreacted $NH_4Cl$ remaining. This can be removed at this stage by filtration. This is not essential because any such $NH_4Cl$ will also be later extracted into the water wash. The resultant crude trimer solution, whether filtered or not, is then subjected to the same trimer purification scheme as previously set forth.

The following examples serve to show how the process has been carried out.

EXAMPLE 1

A crude trimer solution was made by adding 2545 grams of $PCl_5$ (made from $PCl_3$ and $Cl_2$) dissolved in 5915 grams of monochlorobenzene to a slurry of 835 grams of $NH_4Cl$ (made from $NH_3$ plus $HCl$) in 13318 grams of monochlorobenzene over a 4 hour period at 124° C. followed by a 1 hour cook at the same temperature. The resultant crude trimer solution in monochlorobenzene was filtered to remove unreacted ammonium chloride. A 4981 grams portion of the monochlorobenzene solution was then washed with about 2000 grams of water for 1 hour at 60°–86° C. The washed monochlorobenzene solution was then heated under vacuum to evaporate monochlorobenzene to obtain 938 grams of a hot concentrate containing about 32 weight percent monochlorobenzene. The hot concentrate was cooled to room temperature causing crystalline trimer to precipitate. The precipitate was removed by filtration in a dry box and washed with cold heptane yielding 153 grams of crystalline trimer which was placed in a simple distillation vessel. A 10 gram forecut of solvent and volatiles was distilled out first and then a 139 gram heart-cut was distilled under vacuum.

EXAMPLE 2

A 4900 gram portion of a monochlorobenzene solution of crude trimer prepared as in Example 1 was filtered to remove unreacted ammonium chloride. The filtered solution was then heated under vacuum to distill off almost all of the monochlorobenzene solvent leaving a crude trimer residue. The residue was re-dissolved in about 4000 mL of heptane and the heptane solution was water washed at 80° C. A portion of the heptane was then distilled out to form a hot trimer concentrate containing about 32 weight percent heptane. The concentrate was cooled to −10° C. causing trimer to precipitate. The trimer crystals were washed with cold heptane and then distilled using a simple distillation apparatus. A small forecut of solvent and light ends was removed and then a main cut of polymer-grade trimer was distilled at about 130°–140° C., 16 torr.

Another mode contemplated for conducting the process is to:
  (a) add molten phosphorus pentachloride to ammonium chloride slurry in an inert solvent, e.g. monochlorobenzene, to form a solution of crude cyclic polyphosphonitrilic chloride,
  (b) water wash the solution of crude cyclic polyphosphonitrilic chloride at an elevated temperature, e.g. 70°–90° C., to remove unreacted ammonium chloride and other impurities,
  (c) evaporate the solvent to form a hot concentrate containing about 25–50 weight percent solvent,
  (d) cool the hot concentrate to crystallize trimer,
  (e) recover trimer crystals and wash the crystals with a cold solvent and
  (f) distill the recovered crystals to obtain polymer-grade trimer.

We claim:
1. A process for making a polymer-grade cyclic phosphonitrilic chloride trimer, said process comprising
  (a) forming a solution of impure cyclic phosphonitrilic chloride in an inert halogenated hydrocarbon solvent,
  (b) washing said solution with water,

(c) precipitating crystalline cyclic phosphonitrilic chloride trimer from the water-washed halogenated hydrocarbon solution,
(d) separating said precipitated crystalline cyclic phosphonitrilic chloride trimer from said water-washed solution and distilling the separated cyclic trimer to obtain said polymer-grade cyclic phosphonitrilic chloride trimer.

2. A process of claim 1 wherein said inert solvent is a halogenated hydrocarbon boiling in the range of about 50°–250° C. at atmospheric pressure.

3. A process of claim 2 wherein said halogenated hydrocarbon is an aliphatic halogenated hydrocarbon selected from dihalo, trihalo, tetrahalo and perhalo $C_{2-4}$ alkane wherein the halogens are chlorine or bromine or mixed chlorine-bromine.

4. A process of claim 2 wherein said halogenated hydrocarbon is a halogenated benzene compound wherein the halogens are chlorine, bromine or mixtures of chlorine and bromine.

5. A process of claim 4 wherein said solvent is monochlorobenzene.

6. A process of claim 2 wherein said solution of impure cyclic phosphonitrilic chlorides comprises at least 70 weight percent of said inert halogenated hydrocarbon solvent.

7. A process of claim 6 wherein said inert solvent is monochlorobenzene.

8. A process of claim 6 wherein the water-washed solution from step (b) is distilled to remove a portion of said inert solvent halogenated hydrocarbon and from a hot concentrate containing less than 50 weight percent inert solvent.

9. A process of claim 8 wherein said hot concentrate contains about 25 to 40 weight percent inert halogenated hydrocarbon solvent.

10. A process of claim 9 wherein said inert halogenated hydrocarbon solvent is monochlorobenzene.

11. A process of claim 8 wherein said hot concentrate is cooled to cause precipitation of said cyclic phosphonitrilic chloride trimer.

12. A process of claim 11 wherein said inert halogenated hydrocarbon solvent is monochlorobenzene.

13. A process for making polymer-grade cyclic phosphonitrilic chloride trimer, said process comprising (a) reacting ammonium chloride or ammonium chloride precursors with phosphorus pentachloride or phosphorus pentachloride precursors in an inert halogenated hydrocarbon solvent for polyphosphonitrilic chlorides at an elevated temperature and at a pressure sufficient to maintain a liquid phase to form a solution of impure cyclic phosphonitrilic chloride trimer said solution containing at least 50 weight percent of said inert halogenated hydrocarbon solvent,
(b) water-washing said halogenated hydrocarbon solution of impure cyclic phosphonitrilic chloride trimer,
(c) distilling a portion of said inert halogenated hydrocarbon solvent from said solution to form a hot concentrate containing less than 50 weight percent of said inert halogenated hydrocarbon solvent,
(d) cooling said hot concentrate to form a precipitate of crystalline phosphonitrilic chloride trimer,
(e) separating said precipitate from the inert halogenated hydrocarbon solvent phase and
(f) distilling said precipitate to recover polymer-grade phosphonitrilic chloride trimer.

14. A process of claim 13 wherein said inert halogenated hydrocarbon solvent is a halogenated benzene.

15. A process of claim 14 wherein said halogenated benzene is monochlorobenzene.

16. A process of claim 15 wherein said solution of impure phosphonitrilic chloride trimer contains at least 70 weight percent monochlorobenzene.

17. A process of claim 16 wherein said hot concentrate contains about 25 to about 40 weight percent monochlorobenzene.

18. A process of claim 17 wherein the distillation in step (f) is conducted at reduced pressure.

19. A process of claim 18 wherein step (f) is conducted by first distilling a small forecut of about 0.1–10 weight percent of said precipitate and then continuing the distillation to recover the heart-cut of polymer-grade cyclic phosphonitrilic chloride trimer.

20. A process of claim 19 wherein said solution of impure cyclic phosphonitrilic chloride trimer made in step (a) is filtered or centrifuged to remove insolubles prior to step (b).

* * * * *

UNITED STATES PATENT AND TRADEMARK OFFICE
CERTIFICATE OF CORRECTION

PATENT NO. : 4,605,539

DATED : AUGUST 12, 1986

INVENTOR(S) : J. ROBERT ADAMS, JR., ET AL.

It is certified that error appears in the above-identified patent and that said Letters Patent is hereby corrected as shown below:

Column 1, line 38, reads "eavaporation" and should read -- evaporation --.

Column 1, line 41, reads "pessure" and should read -- pressure --.

Column 2, line 7, reads "pessure" and should read -- pressure --.

Column 2, line 67, reads "pessure" (second occurrence), and should read -- pressure --.

Column 3, line 26, reads "1985" and should read -- 1984 --.

Column 7, lines 31-33, reads "said inert solvent halogenated hydrocarbon and from a hot concentrate containing less than 50 weight percent inert solvent" should read -- said inert solvent and form a hot concentrate containing less than 50 weight percent inert halogenated hydrocarbon solvent --.

Signed and Sealed this

Eleventh Day of November, 1986

Attest:

DONALD J. QUIGG

Attesting Officer          Commissioner of Patents and Trademarks